United States Patent [19]
Skolnick et al.

[11] 3,764,937
[45] Oct. 9, 1973

[54] FREQUENCY CONTROLLED, PASSIVELY Q-SWITCH LASER

[75] Inventors: Michael L. Skolnick, West Hartford; Carl J. Buczek, Manchester, both of Conn.

[73] Assignee: United Aircraft Corporation, East Hartford, Conn.

[22] Filed: Apr. 26, 1972

[21] Appl. No.: 247,679

[52] U.S. Cl. .............................. 331/94.5, 350/160
[51] Int. Cl. ............................................ H01s 3/11
[58] Field of Search .................... 331/94.5; 350/160

[56] References Cited
UNITED STATES PATENTS
3,622,908  11/1971  Skolnick ........................... 331/94.5

Primary Examiner—William L. Sikes
Attorney—Melvin Pearson Williams

[57] ABSTRACT

A $CO_2$ laser gain cell is optically in series with an $SF_6$ low pressure-saturable absorber cell in a dispersive laser cavity. The optical length, and therefore the frequency of resonance of the cavity, is controlled by a piezoelectric transducer affixed to one of the cavity resonating mirrors, in response to a control voltage applied thereto, the nature of which varies in dependence upon the utility to which the device is put. In one embodiment, the PRF of the output is compared with a reference, and the resulting control voltage maintains a constant carrier frequency (such as a specific point on the P20 line at 10.6 microns), which in turn maintains a constant PRF due to the relationship between the laser gain characteristic and the saturable absorber characteristic. Rapidly changing PRF is achieved by applying a staircase voltage to the piezoelectric transducer. Carrier frequency sweeping, at different PRFs, is achieved by applying a sawtooth voltage to the piezoelectric transducer.

6 Claims, 5 Drawing Figures

FREQUENCY CONTROLLED, PASSIVELY Q-SWITCH LASER

BACKGROUND OF THE INVENTION

1. Field of Invention

This invention relates to passively Q-switched lasers, and more particularly to control over the carrier frequency and repetition frequency of Q-switching in a low pressure gas saturable absorber passively Q-switched laser.

2. Description of the Prior Art

Recently, attention has been directed toward the application of laser technology to applications, such as communications and radar-type detection, which have heretofore been dominated by millimeter and microwave technology. For instance, digital data communications employing pulse code modulation in the millimeter and microwave spectra are well known and have been developed to a high degree of sophistication. However, the frequency spectra available for assignment to various private and public communication systems for this purpose is crowded in many areas and completely saturated in some of the larger cities. Therefore, it has been thought by some that the solution lies in pushing the frequency still higher, to optical and near-optical frequencies, and particularly to infrared frequencies which are readily attainable from lasers such as the well known 10.6 micron $CO_2$ laser. This is particularly advantageous due to the relatively good transmission characteristics near 10.6 microns in the atmosphere. Also, it has long been known that the resolution of objects using microwave radar is extremely limited with respect to small or closely spaced objects. This is due primarily to the inability to provide a suitably narrow beamwidth and the inability of receiver protection apparatus to respond to reflections which are close to the radar system due to clutter. Although these disadvantages become less significant in millimeter radar, the application of present day, state of the art technology in achieving adequate millimeter radar has left much to be desired. Thus, here also, the laser is being considered to advance the state of the art.

It thus becomes incumbent to provide suitably pulsed lasers. Because of the high amount of laser energy involved, pulsing can typically be done by Q-switching (periodically extracting the energy stored in the laser gain medium itself), so as to generate pulses of energy in a manner which utilizes the excitation continuously added to the laser gain medium (rather than simply chopping to generate pulses from continuous wave energy and thereby using only a small fraction of the excitation). Q-switching has been achieved with rotating mirrors, pulse discharges, and passively, by the use of saturable absorbers within the laser cavity itself. The first two methods limit repetition rates, are difficult to implement and control, and are generally unsuited to the purposes to which sophisticated pulse lasers are to be applied, such as high PRF radar systems. Furthermore, it is known that the maximum unambiguous range from a radar is inversely proportional to the PRF (due to the need to separate return signals from one pulse from those of another). This problem is overcome in microwave transmitters by rapidly varying the PRF as well as the time delay of the range gates so that each target return can be range gated at several PRFs to resolve the range ambiguity. Because of mechanical inertia, rapidly adjusting the PRF of a laser transmitter with rotating mirrors is nearly impossible. Also, because of the high power involved, it is difficult to alter the rate of pulse discharge in a high power laser suitable for use as a radar transmitter.

The literature is replete with reports on the behavior of passively Q-switched lasers. One fundamental problem that stands out is the erratic repetition rate of lasers which are passively Q-switched by means of low pressure, saturable absorbers. The PRF varies on a random basis, is subject to fluctuation as a result of minute variations in other parameters of the laser system, and has heretofore not been capable of specific control over the nominal PRF, but has rather simply provided pulsed laser output at some, uncontrolled, undefinable, varying PRF.

SUMMARY OF INVENTION

The object of the present invention is to provide a PRF controlled, passively Q-switched laser.

The invention is predicated on our discovery that the frequency of Q-switching in a laser which is passively Q-switched by means of a low pressure gas saturable absorber is dependent upon the relationship between the characteristic of laser gain as a function of line frequency and the characteristic of absorption as a function of line frequency. Therefore control of the resonant frequency of the laser cavity, for any given set of parameters, not only controls the line or carrier frequency of the laser, but uniquely defines the PRF of the Q-switching. Consequently, control of cavity resonance as a function of PRF will uniquely define the PRF as well as the laser carrier frequency.

According to the present invention, a dispersive laser cavity including a laser gain medium and a low pressure gas saturable absorber having a saturable absorption characteristic at an optical frequency within the useful range of frequencies of the laser, is provided with means for controlling the resonant frequency of the laser, in a manner related to the pulse repetition frequency of Q-switching of the laser, so as to achieve Q-switched laser operation in the desired fashion. According further to the invention, the cavity length is controlled. In accordance further with the invention, a control voltage, having characteristics related to desired pulse repetition frequency, is used to control a transducer attached to a resonating mirror of the cavity, thereby to adjust the resonance of the cavity. In still further accord with the invention, the pulse repetition frequency of the laser output is compared with a reference, and the difference is used to control a transducer which in turn adjusts the resonance of the laser cavity. In accordance still further with the invention, the control may be open loop or closed loop, and the voltage may be substantially a constant, or may be provided with time varying characteristics so as to produce a desired effect, such as slewing or step function changes in the pulse repetition frequency, the carrier frequency, or both, since these are interdependent. According to the invention still further, the pulse repetition frequency of the laser output may be compared with a frequency standard, and the frequency difference converted to a control voltage for a closed-loop control over the resonant frequency of the laser cavity, thereby to maintain the carrier frequency and PRF of the passively Q-switched laser substantially constant. According further to the invention, the pulse repetition frequency at the laser output may be converted to a voltage and compared with a reference voltage which is used to control the cavity length thereby to maintain the carrier frequency and PRF of the passively Q-switched laser substantially constant.

The present invention provides a great deal of versatility in the control of passively Q-switched lasers. The carrier frequency and PRF may be maintained constant, slewed, or changed in step fashion, to achieve any desired result. The desired result may relate to the control over the carrier frequency or it may relate to control over the PRF of the passively Q-switched laser due to the interdependence therebetween. The present invention is easily implemented with readily available technology, and is capable of precise sophisticated operation.

Other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
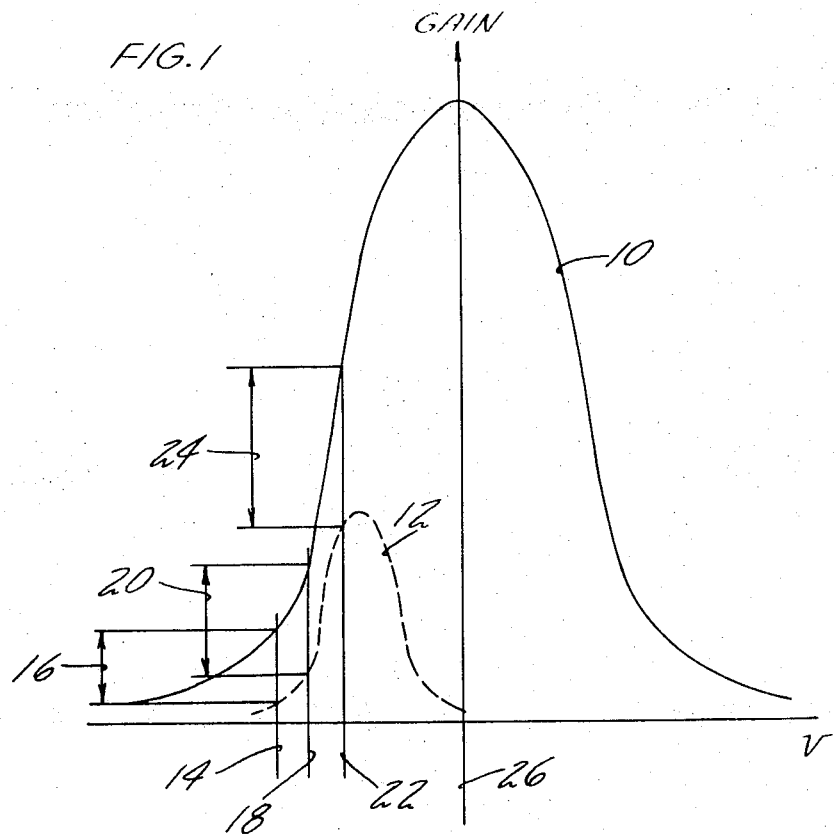
FIG. 1 is a simplified illustration of the relationship between laser gain and absorption as a function of laser optical frequency.

Referring now to FIG. 1, a plot 10 of laser gain as a function of wavelength ($v$) has superposed thereon a plot 12 of the absorption characteristic as a function of wavelength of a low pressure gas saturable absorber. In the specific embodiments described hereinafter with respect to FIGS. 2-5, it is assumed that the laser gain medium includes carbon dioxide, and that the saturable absorber is sulfer hexafluoride. Although the plot 12 in FIG. 1 is representative of the absorption of the saturable absorber, it is to be understood that the saturable absorber has a variable absorption characteristic, which approaches zero when the absorber is saturated. Thus, the curve 12 may represent the unsaturated or average absorption, and which of these is immaterial to the present discussion. At any given optical frequency, $v$, there is a distinct relationship between the gain 10 and the absorption 12. Further, because of the characteristic of gain and the characteristic of absorption (the shapes of the characteristic curves) the relationship differs from one optical frequency to another, although it may be the same for two or more optical frequencies dispersed from one another. For instance at a first frequency denoted by the line 14 there is a gain/absorption relationship designated by the arrow 16. At a frequency designated by a line 18 there is a gain/absorption relationship indicated by the arrow 20, and at a frequency designated by the line 22, there is a gain/absorption relationship represented by the arrow 24. We have found that the relationships (16, 20, 24) are different from each other. We have also found a direct dependence between the PRF of passive Q-switching and the relationships 16, 20, 24. That is, the PRF will be the same for identical relationships (assuming all the other parameters of the system remain constant), but differ for different relationships 16, 20, 24. Thus it is that the PRF is a function of the optical frequency of the laser itself, and the PRF can be adjusted by adjusting the resonant frequency of the laser cavity; and concomitantly, the resonant frequency of the cavity can be monitored by monitoring the PRF of the Q-switching.

It has been reported in the literature that it is necessary to employ a dispersive (frequency selective) cavity to induce Q-switching by a saturable absorber. This is due to the fact that when a non-dispersive laser cavity is utilized, the presence of an absorber, even a saturable absorber, which is effective or has an absorption characteristic at a given optical cavity resonant frequency causes the laser to operate cw at a different cavity resonant frequency falling within another line having a higher net gain characteristic (less loss) than at the cavity mode tuned to the frequency of the absorber. For instance, in the situation of FIG. 1, the laser would more likely operate at a wavelength indicated by the line 26, since this is the frequency of maximum gain (or minimum loss) in the entire system including the absorber. Since the system is not operating at the frequency where the absorber is effective, the absorber does not periodically saturate and does not cause Q-switching of the laser. By making the cavity dispersive, and therefore capable of sustained operation only at a relatively narrow band of wavelengths (i.e. a single line), the aforementioned problem can be avoided. This is a first aspect of the present invention.

Figure 2:
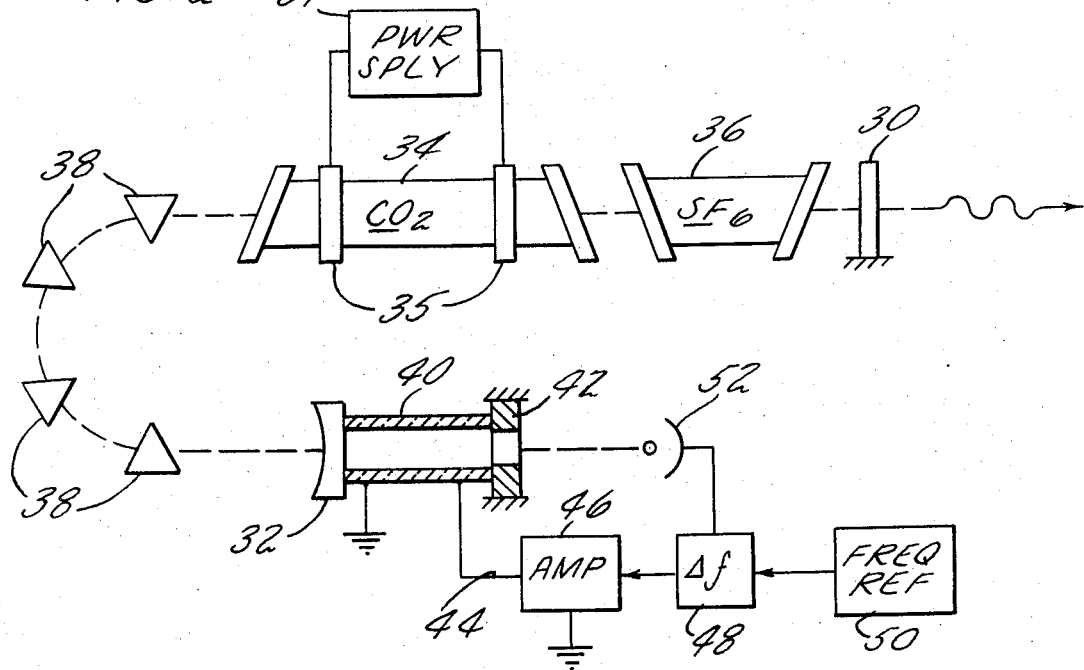
FIG. 2 is a simplified schematic illustration of a feedback controlled embodiment of the present invention.

In FIG. 2 is shown one type of dispersive laser cavity having a low pressure gas saturable absorber within the cavity and provided with means for adjusting the resonant frequency of the cavity. Specifically, the laser cavity comprises a partially reflecting flat mirror 30 and a partially reflecting concave mirror 32 with a cell 34 containing a laser gain medium (such as a mixture including carbon dioxide) with electric field producing electrodes 35 (driven by a power supply 37), a cell 36 containing a low pressure gas saturable absorber (such as sulfer hexafluoride), and a plurality of prisms 38. The prisms 38 bend the laser beam (as indicated by the dashed line in FIG. 2) an amount which is a critical function of the wavelength of the laser beam. That is, the light will be reflected between the mirrors 30, 32 only for a very narrow range of wavelengths, and other wavelengths will be dispersed by the prisms 38 in such a fashion that the laser cavity will not support coherent stimulated emission. This renders the cavity dispersive, and avoids the problem of the laser having a tendency to operate on a transition level other than that which contains the absorption characteristic frequency bandwidth of the saturable absorber. Thus the cavity of FIG. 2 will be Q-switched at a PRF which is dependent upon the precise resonant frequency which is determined by the overall spacing between the mirrors 30, 32. The cavity of FIG. 2 is provided with control over its resonating frequency by means of a suitable transducer, such as a hollow cylindrical piezoelectric crystal 40 to which the mirror 32 is attached, the other end of the crystal 40 being attached to a member 42 which is affixed to the surrounding structure (as in the mirror 30). By applying a suitable voltage across the wall of the cylindrical piezoelectric crystal 40, the axial length of the crystal is altered, which alters the positioning of the mirror 32 with respect to the mirror 30, thereby controlling the resonant frequency of the cavity. The control voltage is applied to the crystal 40 over a line 44 from an amplifier 46 which in turn is driven by a means 48 for providing a DC voltage as a function of the difference between two frequency sources applied thereto; this may be any well known type of frequency comparator such as that commonly referred to as a synchronous demodulator. The synchronous demodulator 48 has a reference frequency applied thereto from a source 50 and an electrical signal applied thereto from a photo detector 52. It is important to note that the photo detector 52 does not have to sense the optical frequency of the laser (that is, it need not operate in a heterodyne mode) but rather need sense only the burst of energy representing the pulses; in other words, the photo detector 52 need be sensitive to the laser radiation but have a frequency response only as high as the PRF of the Q-switching.

In operation, through stimulated coherent emission (as is well known) the laser gain medium within the cell 34 generates electromagnetic radiation at a frequency determined by the spacing of the mirrors 30, 32 within the broad gain characteristic of the gain medium in the cell 34, and within the more narrow transmission band of the prisms 38. In the case of $CO_2$, this is known to occur between 9 and 11 microns. As is known, a low pressure gas saturable absorber, such as sulfer hexafluoride, has an absorption characteristic which is inversely proportional to the intensity of the electromagnetic radiation passing therethrough. As the radiation tends to build up in the cavity, the absorption cell 36 absorbes a lesser amount of it until it is saturated, at which time it becomes transparent to the higher intensity radiation. Then, there is a rapid buildup of laser energy in the cavity providing an output pulse. However, as soon as the saturable absorber recovers, it again commences absorbing the energy eventually spoiling the Q of the system and swamping out the coherent stimulated emission of the electromagnetic energy. Thus, the device is Q-switched at a repetition frequency which is a function of the relationship between the gain characteristic of the laser gain medium in the cell 34 and the absorption characteristic of the saturable absorber in the cell 36. This relationship is a function of the resonant frequency of the cavity which is determined by the spacing of the mirrors 30, 32 under the control of the transducer 40. The photo detector 52 senses each pulse, and establishes a train of pulses at a frequency which is the repetition frequency of the Q-switching. By comparing this with the reference frequency from the source 50, the frequency comparator 48 will provide an error signal which, after amplification, adjusts the electrical stress on the transducer 40 so as to adjust the position of the mirror 32 with respect to that of the mirror 30 in a fashion to maintain the resonant frequency of the cavity constant. Thus, the embodiment of FIG. 2 will provide a very stable carrier frequency of the laser, and at the same time accurately control the pulse repetition frequency of Q-switching of the laser.

The frequency reference illustrated in FIG. 2 may be a constant frequency or a variable frequency. If the frequency is variable, then both the PRF and the carrier frequency of the Q-switched laser will vary commensurately. The laser output may be chirped by providing a sawtooth sweep in the frequency reference 50. Other variations may be provided.

Figure 3:
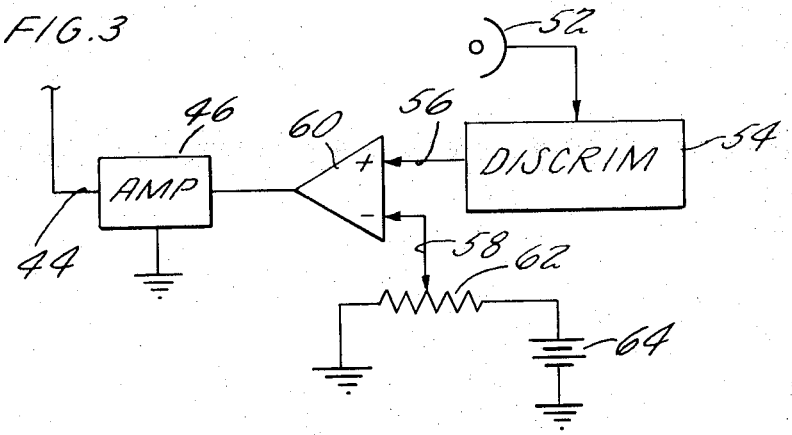
FIG. 3 is a partial simplified schematic illustration of a variation of the embodiment of FIG. 2.

Instead of comparing frequencies, the output of the detector 52 may be fed to a discriminator 54 as illustrated in FIG. 3, so as to provide a DC voltage on a line 56 which is a function of the PRF of the device. This voltage can be compared to a reference voltage on a line 58 in a differential amplifier 60 so as to provide an error signal to the amplifier 46 which will be commensurate to that provided at the output of the synchronous demodulator 48 in FIG. 2. The reference voltage on the line 58 may be provided in any suitable fashion, such as by a simple potentiometer 62 connected to a suitable DC source 64. Obviously, other methods of providing an error voltage as a function of the difference between the actual PRF and a desired PRF can be implemented by those skilled in the art.

Figure 4:
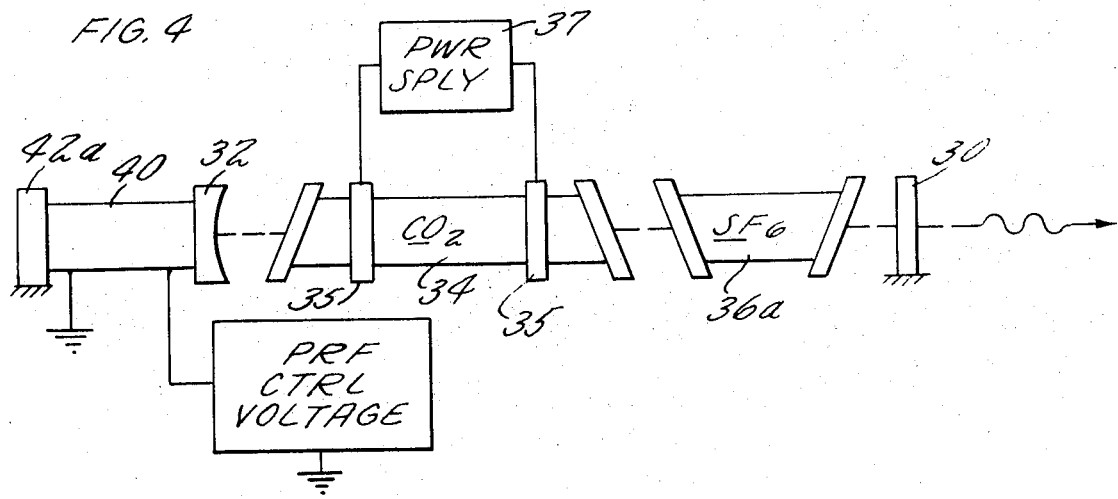
FIG. 4 is a simplified schematic illustration of an open loop embodiment of the present invention.
Figure 5:
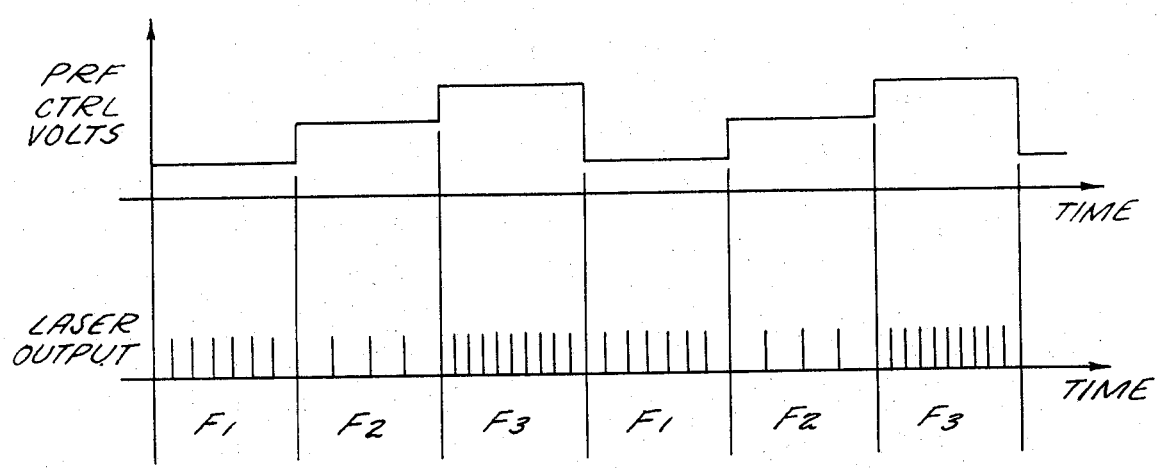
FIG. 5 is a simplified illustration of the relationship between PRF and control voltage in the embodiment of FIG. 4.

The embodiments illustrated in FIGS. 2 and 3 are closed loop: that is the output is monitored to control the length of the optical cavity. On the other hand, with a passively stable laser cavity, the present invention may be practiced in an open loop fashion, if desired, to suit various utilizations thereof, in the manner illustrated with respect to FIGS. 4 and 5. In FIG. 4, the laser structure is basically the same as that illustrated in FIG. 2 with the exception of the fact that there are no prisms 38 and no detector 52. The prisms 38 are not needed in the embodiment of FIG. 4 since the cavity is made to be a dispersive cavity by virtue of utilization of a cell 36a which has not only a low pressure saturable absorber gas therein, but an additional gas, such as chloro-trifluoro-ethylene ($C_2F_3Cl$ which has a high absorption characteristic at frequencies other than the frequency at which the sulfer hexafluoride has a saturable absorption characteristic. Thus, the laser will operate in a Q-switched mode at a frequency within the absorption band of the sulfer hexafluoride rather than in a more lossy mode at other frequencies, where the $C_2F_3Cl$ gas has a high absorption characteristic. Also, in the embodiment of FIG. 4, the structural member 42a need not be hollow to pass the output therethrough to a detector. In this embodiment, the system is run open looped in response to a PRF control voltage from a source 66. The nature of the voltage provided by the PRF control voltage source 66 may vary in dependence upon the desired utilization of the Q-switched laser. For instance, as described hereinbefore, providing multiple PRFs to resolve ambiguous range in a laser radar ranging system would require provision of stepped voltages to the transducer 40. These voltages may be of the type illustrated in FIG. 5. Such voltages may be provided in a simple fashion by decoding a pair of flip flops clocked at a desired frequency of change (roughly one tenth the average desired PRF for the waveform shown in FIG. 5) with the outputs of the flip flops decoded through a D to A converter which will provide these stepped voltages. Otherwise, a breakpoint relaxation oscillator or other known stepped voltage generator may be utilized as the PRF control voltage source 66. As seen in FIG. 5, depending upon the control voltage, the resonant frequency of the cavity will be altered and as described hereinbefore, the PRF will vary (the various PRFs being designated F1, F2 and F3 in FIG. 5). On the other hand, the PRF control voltage source 66 may provide a sawtooth or other waveform so as to chirp the carrier frequency, or to sweep or alter the PRF, in any desired fashion.

The given relationship between the gain characteristic and the absorption characteristic at any optical frequency of the laser is fixed only so long as the remaining parameters are fixed. If the gain characteristic itself changes, such as by altering the electric field which energizes the laser gain medium (if the laser is an electric discharge laser) or altering the pressure, gas makeup constituency, or other parameters (in the case of a flowing gas laser), then the relationship between gain and absorption at any given line frequency will also change. In such a case, the carrier frequency cannot accurately be controlled by the PRF, nor can the PRF be accurately controlled by controlling the line frequency. However, it should be understood that in many applications, the other parameters can be very closely controlled so that the relationship herein will be operable to a sufficient degree of accuracy so as to derive utilization from the present invention.

Although only $CO_2$ is referred to as the laser gain medium herein, it should be understood that in a $CO_2$ laser the gas mixture preferably comprises $CO_2$ and other gases which are useful in controlling the excitation of the $CO_2$, such as nitrogen, helium, etc. All of this is well known in the art and forms no part of the present invention. Similarly, although a static, closed cell laser is illustrated in FIGS. 2 and 4, it should be understood that flowing lasers or lasers of other varieties (such as a helium neon laser) may be utilized if desired. Similarly, gas dynamic lasers which rely on freezing of energy states in a nozzle may be practiced with the present invention, if desired.

Also, the feedback may be achieved by monitoring laser output, as coupled through the partially transmissive mirror 30, rather than having separate output coupling (as through the mirror 32, in FIG. 2).

Thus there has been described various embodiments of the present invention which comprises a dispersive laser cavity with means for controlling the resonant frequency thereof, the cavity including a low pressure gas saturable absorber having a saturable absorption characteristic at a frequency of the laser which is within the band of operating frequencies of the dispersive laser cavity, together with means for controlling the cavity frequency, such as by controlling the cavity length. The frequency could be controlled in other ways, such as by varying the index of refraction of the gas in a cell within the cavity, to alter its effective optical length. A dispersive cavity may be achieved either by a frequency dependent optical path, as illustrated in FIG. 2, by means of an additional absorber as illustrated in FIG. 4, by means of having one of the cavity mirrors scribed to provide a diffraction grating which redirects only a narrow range of frequencies to the opposite mirror by means of multiple coupled cavities, and by other means. Similarly, other types of transducers, such as magnetostrictive devices variable pressure (index of refraction) gas cells, may be utilized in accordance with well known teachings in the art. All of this is immaterial to the present invention. And thus, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A PRF and optical carrier frequency controlled, passive Q-switched laser comprising:

a dispersive laser cavity including at least a pair of mirrors, at least one of which provides output coupling of laser energy from said cavity, said cavity capable of sustaining laser oscillations over a narrow range of wavelengths;

optical gain means disposed within said dispersive laser cavity and having a significant gain characteristic over a wide range of wavelengths in excess of said narrow range;

a low pressure gas saturable absorber means disposed within said laser cavity, said saturable absorber means having a saturable absorption characteristic over a range of wavelengths emcompassing said narrow range but less than said wide range;

and means for controlling the resonant frequency of said optical cavity thereby to control the center of said narrow range of wavelengths.

2. A laser according to claim 1 wherein said last named means comprises means for controlling the optical length of said optical cavity.

3. The laser according to claim 2 wherein said last named means comprises:

a transducer attached to one of said mirrors and operable in response to signals applied thereto to move the mirror to which it is attached; and a control voltage source means for providing a voltage signal to said transducer to control the positioning of said mirror.

4. The laser according to claim 3 wherein said control voltage source means comprises:

optical detection means responsive to pulses of laser energy coupled out of said laser cavity to produce a train of electrical signals, the frequency of which is a measure of the frequency of Q-switching of the laser; and means responsive to said train of electrical signals to generate a control voltage for controlling said transducer.

5. A laser according to claim 3 wherein said control voltage source means comprises:

a reference signal source;

means responsive to laser radiation coupled out of said laser and to said reference signal source for developing a control voltage to control the operation of said transducer.

6. A laser according to claim 3 wherein said control voltage source means comprises:

a DC reference source;

a frequency discriminator;

a differential amplifier responsive to said DC reference source and to said frequency discriminator; and a driver amplifier responsive to the output of said differential amplifier, the output of said driver amplifier being connected to said transducer.

* * * * *